United States Patent
Sengupta et al.

(10) Patent No.: US 9,703,811 B2
(45) Date of Patent: Jul. 11, 2017

(54) ASSESSING DATABASE MIGRATIONS TO CLOUD COMPUTING SYSTEMS

(71) Applicant: Accenture Global Services Limited, Dublin (IE)

(72) Inventors: Shubhashis Sengupta, Karntaka (IN); Vibhu Saujanya Sharma, Bangalore (IN); Venkatesh Subramanian, Bangalore (IN); Subani Bhasha Nure, Bangalore (IN); Aditya Bhola, Bangalore (IN); Sushil Kumar Shah, Sikkim (IN); Chiranjeevi Nalam, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 167 days.

(21) Appl. No.: 14/542,030

(22) Filed: Nov. 14, 2014

(65) Prior Publication Data
US 2015/0363396 A1    Dec. 17, 2015

(30) Foreign Application Priority Data
Jun. 16, 2014   (IN) .......................... 2910/CHE/2014

(51) Int. Cl.
*G06F 17/00* (2006.01)
*G06F 17/30* (2006.01)

(52) U.S. Cl.
CPC ...... *G06F 17/303* (2013.01); *G06F 17/30082* (2013.01); *G06F 17/30592* (2013.01); *G06F 17/30598* (2013.01)

(58) Field of Classification Search
CPC ............. G06F 17/303; G06F 17/30592; G06F 17/30598; G06F 17/30082

(Continued)

(56) References Cited

U.S. PATENT DOCUMENTS 8,838,534 B2 *  9/2014  Fowler ................... G06F 9/466
                                                    707/615
8,918,439 B2 * 12/2014  Alatorre ............ G06F 17/30082
                                                    707/609

(Continued)

FOREIGN PATENT DOCUMENTS

WO    WO 2015/126411 A1 *  8/2015  ............... G06F 9/48

OTHER PUBLICATIONS

Das, Sudipito, et al., "ElasTraS: An Elastic, Scalable, and Self-Managing Transactional Database for the Cloud", ACM Transactions on Database Systems, vol. 38, No. 1, Article 5, 45 pages.*

(Continued)

*Primary Examiner* — Robert Stevens
(74) *Attorney, Agent, or Firm* — Fish & Richardson P.C.

(57) ABSTRACT

This disclosure relates to assessing database migrations to cloud computing systems. On example method includes determining, by a migration server including one or more hardware processors, a set of possible transactions associated with a database application based at least in part on a set of application attributes associated with the database application; generating, by the migration server, a set of application requirements associated with the set of possible transactions; and creating, by the migration server, a set of migration recommendations associated with the database application based on the set of application requirements, the set of migration recommendations configured to allow the database application to be migrated to a cloud computing system and to allow the database application to comply with the set of application requirements when executed in the cloud computing system.

16 Claims, 17 Drawing Sheets

(58) Field of Classification Search
USPC .......................................................... 707/609
See application file for complete search history.

(56) References Cited

U.S. PATENT DOCUMENTS

| | | | | |
|---|---|---|---|---|
| 9,325,791 | B1* | 4/2016 | Blahaerath | H04L 67/1097 |
| 2011/0041006 | A1* | 2/2011 | Fowler | G06F 9/466 714/10 |
| 2011/0314069 | A1* | 12/2011 | Alatorre | G06F 17/30082 707/827 |
| 2012/0089726 | A1* | 4/2012 | Doddavula | H04L 67/34 709/224 |
| 2012/0117030 | A1* | 5/2012 | Sakuma | G06F 17/303 707/654 |
| 2012/0131173 | A1* | 5/2012 | Ferris | G06F 9/5066 709/224 |
| 2012/0304179 | A1* | 11/2012 | Devarakonda | G06F 9/5072 718/102 |
| 2013/0007216 | A1* | 1/2013 | Fries | G06F 9/4856 709/218 |
| 2014/0108332 | A1* | 4/2014 | Haze | G06F 17/30156 707/609 |
| 2014/0172783 | A1* | 6/2014 | Suzuki | G06F 8/63 707/609 |
| 2015/0019487 | A1* | 1/2015 | Buehne | G06F 17/30377 707/632 |
| 2015/0212920 | A1* | 7/2015 | Kraus | G06F 11/3466 717/127 |
| 2015/0254240 | A1* | 9/2015 | Li | G06F 17/30575 707/703 |
| 2015/0254257 | A1* | 9/2015 | Kritchko | G06F 17/303 707/634 |
| 2016/0219109 | A1* | 7/2016 | Blahaerath | H04L 67/1097 |

OTHER PUBLICATIONS

Wilkerson, Daniel Shawcross, et al., "Distributed Transactions for Google App Engine: Optimistic Distributed Transactions built upon Local Multi-Version Concurrency Control", Cornell University Library, arXiv:1106.3325v1, Jun. 2011, 65 pages.*

Chauhan, Muhammad Aufeef, et al., "Towards Process Support for Migrating Applications to Cloud Computing", CSC 2012, Shanghai, China, Nov. 22-24, 2012, pp. 80-87.*

Frey, Sören, et al., "Automatic Conformance Checking for Migrating Software Systems to Cloud Infrastructures and Platforms", Journal of Software Maintenance and Evolution: Research and Practice, John Wiley & Sons, Ltd., © 2011, 28 pages.*

Hajjat, Mohammad, et al., "Cloudward Bound: Planning for Beneficial Migration of Enterprise Applications to the Cloud", SIGCOMM '10, New Delhi, India, Aug. 30-Sep. 3, 2010, pp. 243-254.*

"De-mystifying eventual consistency in distributed systems", Oracle: NoSQL Database, Oracle, Jun. 2012, 2 pages.*

Strauch, Steve, et al., "Migration Applications Data to the Cloud Using Cloud Data Patterns", CLOSER 2013, Aachen, Germany, May 8-10, 2013, pp. 36-46.*

Curino, Carlo, et al., "Schism: a Workload-Driven Approach to Database Replication and Partitioning", Proc. of the VLDB Endowment, vol. 3, No. 1, © 2010, pp. 48-57.*

* cited by examiner

Assessment Summary

1152 — Assessment Inputs

- Database Name: sakila
- Database Size: 6.6MB
- Required IOPS: 579
- Application: Hibernate_test_app.zip

Transactions

| Database Transactions (6) | T0 T1 T2 T3 T4 T5 |
| --- | --- |
| Application Transactions (6) | T6 T7 T8 T9 T10 T11 |
| User_Created Transactions (0) | |

1154 — Assessment Outputs

- Transactions exceeding Size Limits: None
- Transactions exceeding IOPS Limits: None
- Number of Cloud DB Instances: 1
- Total Cloud DB Size: 5GB
- Total Cloud DB IOPS: 100

| Cloud DB | Storage Size | Transactions Data Size | IOPS | Transactions |
| --- | --- | --- | --- | --- |
| DB0 | 5.0 GB | 5MB | 579 | T0 T1 T2 T3 T4 T5 T6 |

FIG. 11B

Assessment Summary

Assessment Inputs

Database Name: sakila
Database Size: 6.6MB
Required IOPS: 579
Application: Hibernate_test_app.zip

Transactions

| Database Transactions (6) | T0 T1 T2 T3 T4 T5 |
| Application Transactions (6) | T6 T7 T8 T9 T10 T11 |
| User_Created Transactions (0) | |

Assessment Outputs

Transactions exceeding Size Limits: None
Transactions exceeding IOPS Limits: T0, T6, T8, T9
Number of Cloud DB Instances: 3
Total Cloud DB Size: 15GB
Total Cloud DB IOPS: 300

| Cloud DB | Storage Size | Transactions Data Size | IOPS | Transactions |
|---|---|---|---|---|
| DB0 | 5.0 GB | 3MB | 90 | T1 T2 T7 |
| DB1 | 5.0 GB | 3MB | 100 | T3 T4 T10 |
| DB2 | 5.0 GB | 3MB | 84 | T5 T11 |

FIG. 14

ASSESSING DATABASE MIGRATIONS TO CLOUD COMPUTING SYSTEMS

CROSS-REFERENCE TO RELATED APPLICATION

The present application claims the benefit of Indian Patent Application No. 2910/CHE/2014, filed on Jun. 16, 2014, which is incorporated herein by reference in its entirety for all purposes.

FIELD

This disclosure relates to assessing database migrations to cloud computing systems.

BACKGROUND

Cloud computing systems, generally, are distributed processing systems including multiple computing devices connected by and communicating over a network. Software applications may be run "in the cloud" by configuring them to execute across one or more of the computing devices in a particular cloud computing system. The computing devices of a cloud computing system may each execute separate copies of the software application, or, in some cases, the operations of the software application may be split among different computing devices and executed in parallel. A cloud computing system may include a plurality of cloud computing instances representing resources available for executing applications. Each instance may be a physical computing device having particular capabilities (storage size, processing speed, network bandwidth, etc.), or may be a virtual computing device having particular capabilities. A particular cloud computing system may offer different instance types having different sets of capabilities for executing software applications.

SUMMARY

In one aspect, a computer-implemented method includes determining, by a migration server including one or more hardware processors, a set of possible transactions associated with a database application based at least in part on a set of application attributes associated with the database application. The migration server generates a set of application requirements associated with the set of possible transactions; and creates a set of migration recommendations associated with the database application based on the set of application requirements, the set of migration recommendations configured to allow the database application to be migrated to a cloud computing system and to allow the database application to comply with the set of application requirements when executed in the cloud computing system.

Implementations may include one or more of the following features. The migration server may present a report including the set of migration recommendations. In some cases, creating the set of migration recommendations includes mapping each transaction in the set of possible transactions to a particular type of cloud computing instance included in the cloud computing system. The set of application requirements may include at least one of: a set of consistency requirements, a set of performance requirements, or a set of storage capacity requirements. In some implementations, generating the set of consistency requirements includes determining a set of transaction groups each including two or more transactions from the set of possible transaction, each transaction group representing transactions that depend on overlapping data attributes, and the set of migration recommendations is configured to place the transactions from each transaction group on a same cloud computing instance. Each transaction group may include at least one write transaction and a corresponding read transaction that reads data written by the at least one write transaction.

In addition, the method may include determining that a particular transaction group is unable to execute on the same cloud computing instance based on the set of performance requirements or the set of storage capacity requirements; determining whether the particular transaction group requires strong consistency; and modifying the set of migration recommendations to split the particular transaction group across one or more cloud computing instances in response to determining that the particular transaction group is unable to execute on the same cloud computing instance and determining that the particular transaction group does not require strong consistency. The set of migration recommendations may also be modified to retain the particular transaction group on the same cloud computing instance by moving at least one other transaction group to a different cloud computing instance in response to determining that the particular transaction group is unable to execute on the same cloud computing instance and determining that the particular transaction group requires strong consistency. The set of consistency requirements may include at least one of atomicity requirements, isolation requirements, or durability requirements. The set of performance requirements includes a required number of input/output operations per second (IOPS). In some cases, the set of storage capacity requirements includes a required amount of data storage capacity.

In some cases, the set of application attributes associated with the database application includes at least one of: a set of application instruction, a database definition, a database usage log, or a set of user-provided attributes. Determining the set of application attributes associated with the database application may include running a simulation of the database application.

In another general aspect, a non-transitory, computer-readable medium stores instructions operable when executed to cause at least one processor to perform operations including determining a set of possible transactions associated with a database application based at least in part on a set of application attributes associated with the database application; generating a set of application requirements associated with the set of possible transactions; and creating a set of migration recommendations associated with the database application based on the set of application requirements, the set of migration recommendations configured to allow the database application to be migrated to a cloud computing system and to allow the database application to comply with the set of application requirements when executed in the cloud computing system.

In another aspect, a system includes a database migration server including one or more processors and operable to interact with a database server hosting a database application to determine a set of possible transactions associated with the database application based at least in part on a set of application attributes associated with the database application. The system also includes a migration recommendation server including one or more processors and operable to: receive the set of application attributes from the database migration server; generate a set of application requirements associated with the set of possible transactions; create a set of migration recommendations associated with the database application based on the set of application requirements, the set of migration recommendations including instructions for migrating the database application to a cloud computing system while ensuring that the migrated database application will comply with the set of application requirements when executed in the cloud computing system.

The details of one or more implementations are set forth in the accompanying drawings and the description, below. Other potential features of the disclosure will be apparent from the description and drawings, and from the claims.

BRIEF DESCRIPTION OF THE DRAWINGS

FIGS. 3-14 are diagrams illustrating exemplary user interfaces.

DETAILED DESCRIPTION

Figure 1:
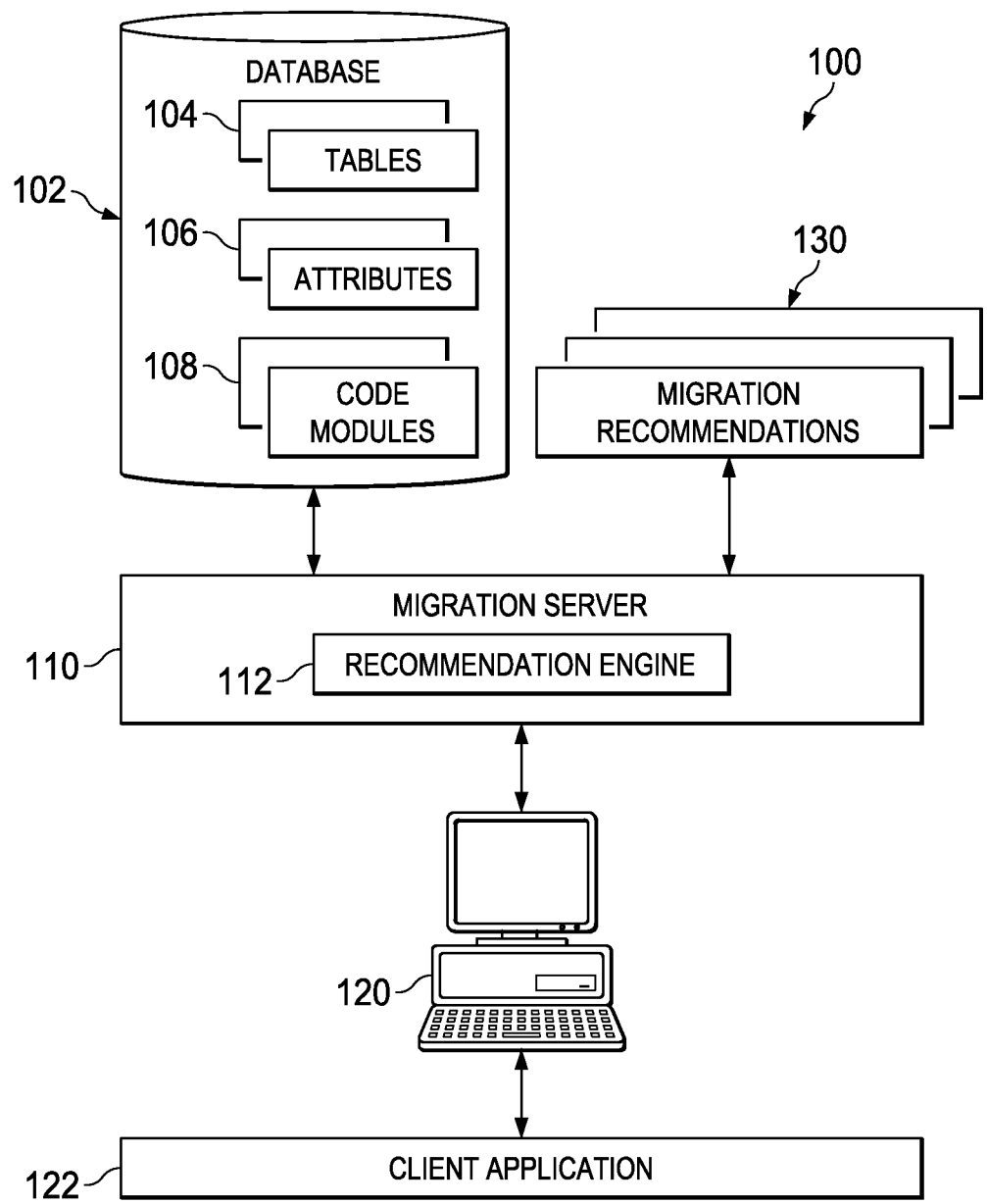
FIG. 1 is a diagram of an example system for assessing database migrations to cloud computing systems.

Cloud computing systems generally offer greater scalability, redundancy, and performance than single computing devices or small groups of computing devices. For example, database applications can be distributed across many nodes of a cloud computing system to allow for data redundancy, allow greater data throughput, and to take advantage of other cloud computing benefits, such as the ability to spawn additional storage or processing resources on-demand. Accordingly, it may be desirable to migrate existing database applications for use in the cloud. Such a migration may in some cases be relatively simple, such as in cases where the database application provides read-only access to its data or does not require data to be current or consistent. However, many database applications require data consistency that can make migration to a cloud computing system difficult. For example, if a particular database application requires that a certain table that is both written to and read always reflect the most current data when read, requests to read from the table must be delayed while data is being written. On a single computing device or a small set of computing devices, such a constraint may not be difficult to enforce, but in a cloud computing environment including possibly hundreds or even thousands of servers, waiting for a write to replicated before allowing a read may lead to unacceptable performance degradation.

Accordingly, the present disclosure describes techniques for generating migration recommendations based on a particular database application. One example method includes determining a set of possible transactions associated with a database application to be migrated to a cloud computing system based at least in part on a set of application attributes associated with the database application. A set of application requirements is then determined associated with the set of possible transactions. A set of migration recommendations is created associated with the database application based on the set of application requirements. The migration recommendations may allow the database application to be migrated to the cloud computing system and allow the database application to comply with the set of application requirements when executed in the cloud computing system.

The techniques described herein may provide several advantages. Automatic assessment of a database application's cloud migration requirements may allow stakeholders to determine which benefits of a cloud environment a particular database application will be able to leverage in its current state. If certain benefits are not available, the database application may be redesigned or a different cloud computing system may be considered. Further, performing such assessments may allow application requirements to be respected during a migration to a cloud environment, and may actually enable stakeholders to discover additional application requirements implied by the database applications structure or attributes. Attributes that are not part of any transaction may also be identified, allowing stakeholders to take appropriate actions.

FIG. 1 is a diagram of an example system 100 for assessing database migrations to cloud computing systems. As shown, the system 100 includes a migration server 110 configured to interact with the database 102 and a client 120. In operation, the migration server 110 analyzes the database 102 and receives user input from the client 120 to produce a set of migration recommendations 130. Migration recommendations 130 represent a set of recommended actions for migrating the database 102 to a particular cloud computing system (not shown).

System 100 includes a database 102. In some implementations, the database 102 may be a database application executing across one or more servers. The database 102 may also be a database schema or other type of definition describing the structure of the database. In some cases, the database 102 may be a database application that is to be migrated to a cloud computing system. The database 102 may be configured to execute on a single server or a limited set of servers rather than a cloud computing system including a large number of servers. In some implementations, the database 102 may be executed by or stored in a format associated with a particular database management system (DBMS), such as, for example, MySQL, ORACLE, MICROSOFT SQL SERVER, IBM DB2, INFORMIX, POSTGRES, SAP SYBASE, TERADATA, or other database management systems. In some cases, the database 102 may be a relational database.

As shown, the database 102 includes one or more tables 104. In some cases, the one or more tables 104 may represent structured data schemas including one or more columns configured to store data in one or more rows. The tables 104 may include constraints defining rules for data stored in a particular table, relations between different ones of the one or more tables 104 (foreign keys), columns that uniquely identify a particular row in a particular table 104 (primary keys), or other constraints.

Database 102 also includes one or more attributes 106. In some cases, the attributes 106 include unique columns that appear within the one or more tables 104. For example, the first table contains a "color" column that references a second table including the "color" column, the first table in the second table share the "color" attribute. In some cases, a single attribute 106 may appear as a column in two or more of the tables 104. The attributes 106 may represent unique data elements within the database 102.

The database 102 also includes one or more code modules 108. In some implementations, the code modules 108 may include instructions within the structure of the database 102 itself, such as triggers, stored procedures, prepared statements, or other instructions. Code modules 108 may also include applications external to the database 102 used to access the database 102, such as, for example, database drivers, application code that uses the database 102, or other types of applications. The code modules 108 may also include queries executed against the database 102 during processing. The queries may be formatted according to the query language, such as, for example, Structured Query Language (SQL), Java Persistence Query Language (JPQL), Hibernate Query Language (HQL), or other query languages.

System 100 also includes a client 120. Illustrated client 120 is intended to encompass any computing device, such as a desktop computer, laptop/notebook computer, wireless data port, smart phone, personal data assistant (PDA), tablet computing device, one or more processors within these devices, or any other suitable processing device. For example, client 120 may comprise a computer that includes an input device, such as a keypad, touch screen, or other device that can accept user information and an output device that conveys information associated with the operation of the migration server 110 or client 120 itself, including digital data, visual information, or a graphical user interface (GUI). As shown, the client 120 executes a client application 122. In some cases, the client application 122 may be a visual software application operable to present information to a user and receive input from the user. In some cases, the client application 122 may be operable to display the screens shown in FIGS. 3-14, and described in the present disclosure. The client application 122 may communicate user input regarding the migration of the database 102 to migration server 110.

System 100 includes migration server 110. In operation, the migration server 110 may analyze the database 102 and user input received from the client application 122 to produce a set of migration recommendations 130. In some cases, migration server 110 may be a server or set of servers connected to the database 102 and the client 120 by a network or set of networks (not shown). The migration server 110 may also be a software program or set of software programs executed by a server. In some cases, the migration server 110, the database 102, and the client 120 may be executed on the same computing device.

Migration server 110 includes a recommendation engine 112. In operation, the recommendation engine 112 analyzes the database 102, including the tables 104, the attributes 106, the code modules 108, and other information associated with the database 102, such as, for example, data stored in the database 102, logs describing access activity for the database 102, metadata associated with the database 102, and other information, to produce the migration recommendations 130. The operation of the recommendation engine 112 is described in greater detail relative to FIG. 2. In some cases, recommendation engine 112 may be a software program or set of software programs executed by migration server 110. Recommendation engine 112 may also be a software module or set of software modules within the migration server 110. The recommendation engine 112 may also be a separate server or servers from the migration server 110.

Migration server 110 produces a set of migration recommendations 130. The migration recommendations 130 may include a proposed configuration for executing the database 102 in a particular cloud computing environment. For example, migration server 110 may analyze the database 102 and determine that a particular size of cloud computing instance offered by a cloud computing provider is sufficient to execute the database 102. In such a case, the set of migration recommendations 130 would reflect this conclusion. The set of migration recommendations 130 may also identify operations, such as transactions, associated with the database 102 that are incompatible with a particular cloud computing system, not recommended for execution on a particular cloud computing system, or infeasible in a particular cloud computing system. These determinations are described in greater detail below.

Figure 2:
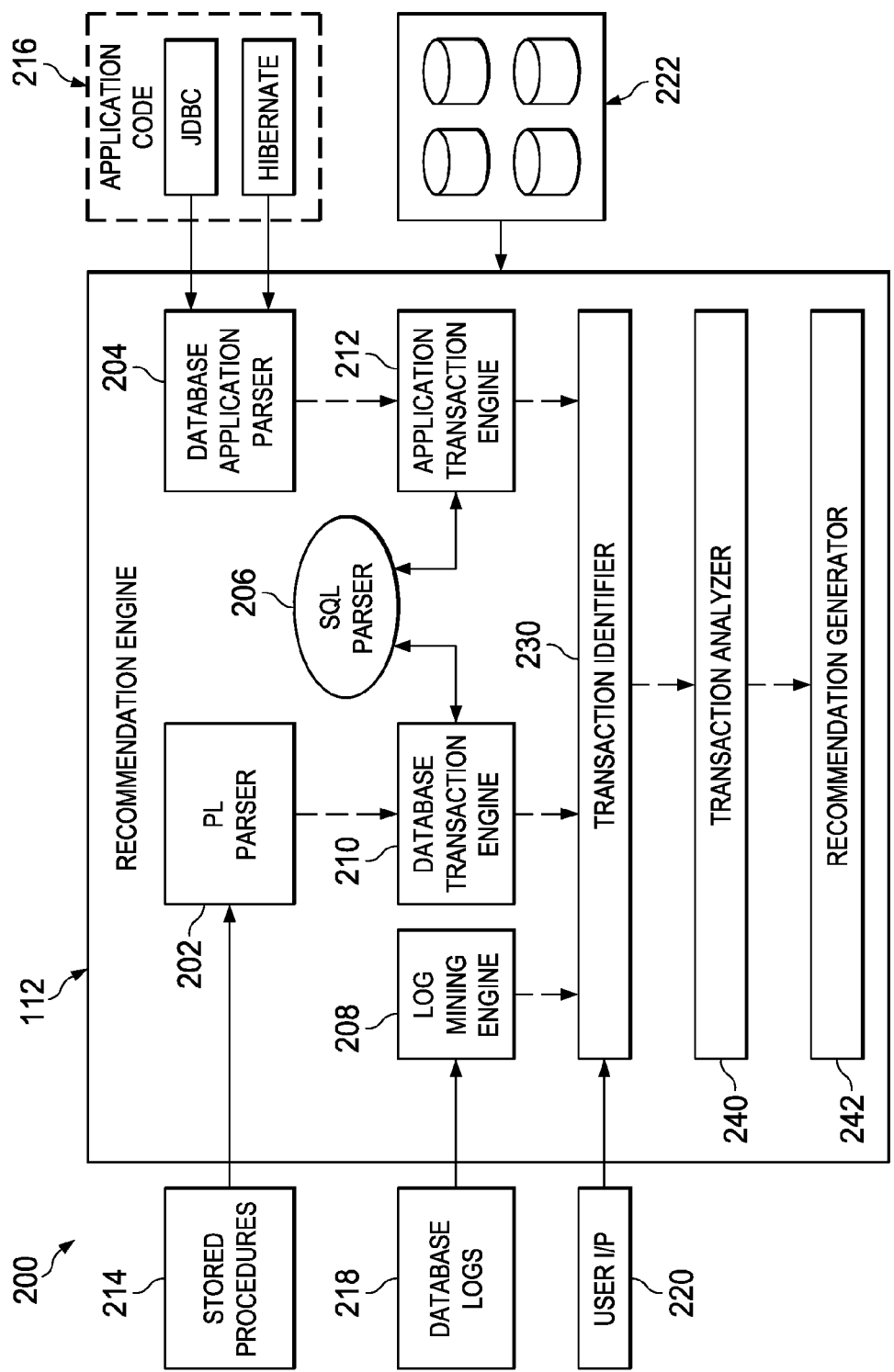
FIG. 2 is a diagram of an example recommendation engine included in the example system of FIG. 1.

FIG. 2 is a diagram of the example recommendation engine 112 included in the example system of FIG. 1. As shown, recommendation engine 112 includes one or more analysis components 202-212 operable to perform portions of a recommendation analysis performed by the recommendation engine 112. The one or more analysis components 202-212 may be code modules within a software implementation of the recommendation engine 112. For example, each of the analysis components 202-212 may be a library, an object, a set of functions, or other software structure within the recommendation engine 112. In some cases, the one or more analysis components 202-212 may be independent software processes communicating with each other to perform collectively the recommendation analysis of the recommendation engine 112. In some cases, the one or more analysis components 202-212 may reside on the same server, or may reside on different servers and communicate with one another over a network (not shown).

Operations of each of the one or more analysis components 202-212 will now be described. PL parser 202 is operable to parse a set of stored procedures 214 associated with a database to be analyzed 222. In some cases, stored procedures 214 may be defined in embedded programming language within the database, such as, for example, Procedure Language (PL). Stored procedures 214 may also be defined in a standalone programming language such as, for example, JAVA, JAVASCRIPT, C++, PERL, PYTHON, or other programming languages. In some cases, the PL parser 202 may analyze the stored procedures 214 to determine a set of database attributes accessed by each of the stored procedures 214. This information may be used at other stages of the analysis to determine transactions associated with database to be analyzed. In some cases, the PL parser 202 may be associated with a particular type of database 222, and may be operable to parse the specific stored procedures supported by the database type. In such a case, there may be multiple PL parsers 202 each handling different database types. In some implementations, the PL parser 202 may support multiple types of databases.

A database application parser 204 is operable to analyze application code 216 associated with the database to be analyzed. In some implementations, the application code 216 may include code operable to access the database to be analyzed 222. Database application parser 204 may analyze the application code 216 to determine access scenarios associated with the database to be analyzed 222. These access scenarios represent the possible ways in which database 222 could be accessed by the application code based on information within the application code, such as instructions included in the application code 216 operable to access the database 222, attributes from database 222 used within the application code 216, comments indicating how the application code 216 accesses the database 222, query statements associated with the database 222, API calls associated with the database 222, objects instantiated or defined associated with the database 222, and other such information. For example, the database application parser 204 may identify a set of attributes in the database to be analyzed 222 that are accessed by the application code 216, and may identify second set of attributes in the database to be analyzed 222 that are not accessed by the application code 216. The database application parser 204 may just determine which attributes in the database 222 should be considered when generating recommendations for migrating the database 222.

In some cases, the database application parser 204 may identify prepared statements within the application code 216 to identify the access scenarios. In some cases, the database application parser 204 may parse the application code looking for query language statements, such as SQL or HQL. The application code 216 may include instructions in one or more programming languages, including, but not limited to, JAVA, JAVASCRIPT, PERL, PYTHON, PHP, C++, C#, ERLANG, VISUAL BASIC, or other programming. The application code 216 may also include API calls to known database access technologies, such as Java Database Connectivity (JDBC) or Hibernate, that may be analyzed to determine access behavior of the application code 216. The data produced by the database application parser 204 is passed to other components for further analysis, as described below.

The recommendation engine 112 also includes a log mining engine 208 operable to parse database logs 218 associated with the database to be analyzed 222. The database logs 218 may include historical entries representing access activity for the database to be analyzed 222. Log mining engine 208 may parse these database logs 218 to determine how the database to be analyzed 222 is accessed during normal operation. For example, the log mining engine 208 may identify all unique queries present in the database log 218 to determine the set of attributes within the database 222 that are accessed during normal operation. Log mining engine 208 may also identify performance metrics associated with normal operation of the database 222 by analyzing the database logs 218, such as, for example, by determining a number of queries submitted to the database during a certain time. The data produced by the log mining engine 208 is passed to other components for further analysis, as described below.

Recommendation engine 112 includes a database transaction engine 210. In operation, the database transaction engine 210 receives analysis data from the PL parser 202 and determines a set of transactions associated with the database 222 from this data. For example, the database transaction engine 210 may receive SQL statements associated with the stored procedures 214 from the PL parser 202. Database transaction engine 210 may pass the SQL statements to the SQL parser 206 in order to identify transactions associated with the SQL statements. A transaction is defined as an access behavior associated with the database 222. For example, if the stored procedures 214 include a procedure to write to a set of tables in an atomic action (i.e., in programming, an action that effectively happens all at once, such that no side effects are visible until the action is complete), this write operation may be identified as a transaction by the database transaction engine 210. Similarly, if the stored procedures 214 include an operation to read from a set of tables in an atomic action, this reoperation may also be identified as a transaction by the database transaction engine 210. In some implementations, the SQL parser 206 may be a generic parsing library to identify different parameters within an SQL statement. The SQL parser 206 may also include analysis logic for identifying transactions.

The recommendation engine 112 also includes an application transaction engine 212. The application transaction engine 212 may be operable to receive information from the database application parser 204 and identify transactions performed against the database 222 by the application code 216. In some cases, the application transaction engine 212 may perform analysis similar to the database transaction engine 210, except that the analysis of the application transaction engine 212 may be performed relative to the application code 216 rather than the stored procedures 214. The application transaction engine 212 also similarly leverages the SQL parser 206.

The log mining engine 208, the database transaction engine 210, and the application transaction engine 212 provide analysis data to a transaction identification module 230. In operation, the transaction identification module 230 identifies ways in which the database 222 may be accessed (transactions) by analyzing the various analysis data received from the other components. These identified transactions are then used, along with other data, to determine the migration recommendations (described below). The transaction identification module 230 also receives user input 220, such as the user input described relative to clients 120 in FIG. 1. In some cases, the user input 220 may include indications of transactions associated with the database 222, parameters associated with a cloud computing system to which the database 222 is to be migrated, or other user input. The transaction identification module 230 also interacts with the database 222 to further identify transactions. For example, the transaction identification module 230 may inspect the structure of the database 222, including tables, constraints, keys, data stored in the database 222, or other information to determine transactions associated with the database 222. In some cases, the transaction identification module 230 may parse an SQL schema associated with the database 222 to inspect the structure of the database 222. The transaction identification module 230 may also connect to a database management system (not shown) for managing database 222 to inspect the structure of the database 222. In some cases, the set of transactions identified by the transaction identification module 230 may be merged with a set of transactions identified by the log mining engine 208, the database transaction engine 210, and the application transaction engine 212, and this merged set of transactions may be provided to a transaction analysis component 240.

The transaction analysis component 240 may analyze the set of transactions to determine additional information associated with the set of transactions. For example, transaction analysis component 240 may identify a transaction that writes a particular set of attributes within the database 222, and a matching transaction that reads the same particular set of attributes within the database 222. In such a case, transaction analysis component 240 may create a transaction group including these two transactions, which may be referred to as overlapping transactions. The transaction group may be considered together for recommendation purposes, such as for example, by generating recommendations so that all transactions with the transaction group are performed on the same server or set of servers within the cloud computing system.

Transaction analysis component 240 may also determine requirements associated with each transaction or transaction group. For example, the transaction analysis component 240 may identify a consistency requirement associated with a particular transaction group specifying that the transactions within the group should be associated with the same instance or set of instances within the cloud computing system to reduce the chance of either transaction within the group encountering stale data due to replication delays between instances. Transaction analysis component 240 may also identify performance requirements associated with a particular transaction or set of transactions specifying performance parameters that should be met by a cloud computing instance handling the particular transaction or set of transactions. Such performance parameters may include minimum response time, number of processors, network bandwidth, storage capacity, or other parameters.

Transaction analysis component 240 provides the results of its analysis to the recommendation generator 242. In operation, the recommendation generator 242 analyzes the requirements produced by the transaction analysis component 240, the set of transactions produced by the transaction identification module 230, and the parameters associated with the particular cloud computing system to which the database 222 is to be migrated to generate a set of migration recommendations. For example, the recommendation generator 242 may examine each identified transaction and any requirements associated with the transaction, and attempt to allocate the identify transaction within the particular cloud computing system according to the requirements. For example, if a particular transaction requires 5 GB of storage, the recommendation generator 242 may associate the particular transaction with an instance type within the cloud computing system that offers greater than 5 GB storage. In some cases, the recommendation generator 242 may allocate transactions within a transaction group having a consistency requirement to the same instance within the cloud computing system.

In some cases, the recommendation generator 242 may identify transactions that cannot be allocated within the particular cloud computing system. For example, a particular transaction may include a performance requirement is greater than any instance type associated with particular cloud computing system. In such a case, the recommendation generator 242 may include an indication of this allocation failure within the set of migration recommendations. The recommendation generator 242 may also identify transactions or transaction groups that may be split across instances within the particular cloud computing system while still fulfilling associated requirements. For example, if a transaction group having a storage requirement of 10 GB it is to be migrated to a cloud computing system offering instances with 6 GB of storage, the recommendation generator 242 may generate a recommendation to split the data associated with the transaction group across two instances within the cloud computing system. If the data is split such that overlapping transactions for a particular data item are processed by the same instance, the consistency requirement may still be fulfilled. The recommendation generator 242 may generate recommendations indicating other modifications may be made to the database 222 in order to fulfill the identified requirements associated with the identify transactions, such as data partitioning, transaction splitting, transaction merging, or other modifications.

As described, the recommendation generator 242 may produce a set of migration recommendations associated with the database 222. Migration recommendations may include allocations of each transaction or transaction group to a particular instance type and number of instances within the cloud computing system. In some cases, the recommendation generator 242 may be provided with multiple cloud computing systems to which to migrate the database 222, and may produce a comparison of the operations required migrate the database 222 to each of the cloud computing systems.

In some implementations, the recommendation generator 242 may also automatically determine a suitable cloud computing system and instance types that satisfy database application or user requirements, such as, for example, cost requirements, performance requirements, or other requirements. In some cases, the recommendation generator 242 may determine a plurality of suitable configurations meeting such requirements. The recommendation generator 242 may also present the configurations in a ranked or ordered list indicating their relative levels of suitability.

In some cases, the recommendation generator 242 may produce the migration recommendations in a human readable form to be presented to a user. For example, migration recommendations may include textual or visual descriptions of the operations required to migrate the database 222, the proposed allocation of transactions to instances within the cloud computing system, or of other information. The migration recommendations may also be encoded in a particular file format, such as, for example, Portable Document Format (PDF), Extensible Markup Language (XML), Hypertext Markup Language (HTML), or other formats.

FIGS. 3-14 are diagrams illustrating exemplary user interfaces 300-1400. In some cases, the user interfaces 300-1400 are presented as steps within a workflow or wizard, such that the user is directed to provide input in one user interface and activate a next button to continue to the next user interface in the sequence.

Figure 3:
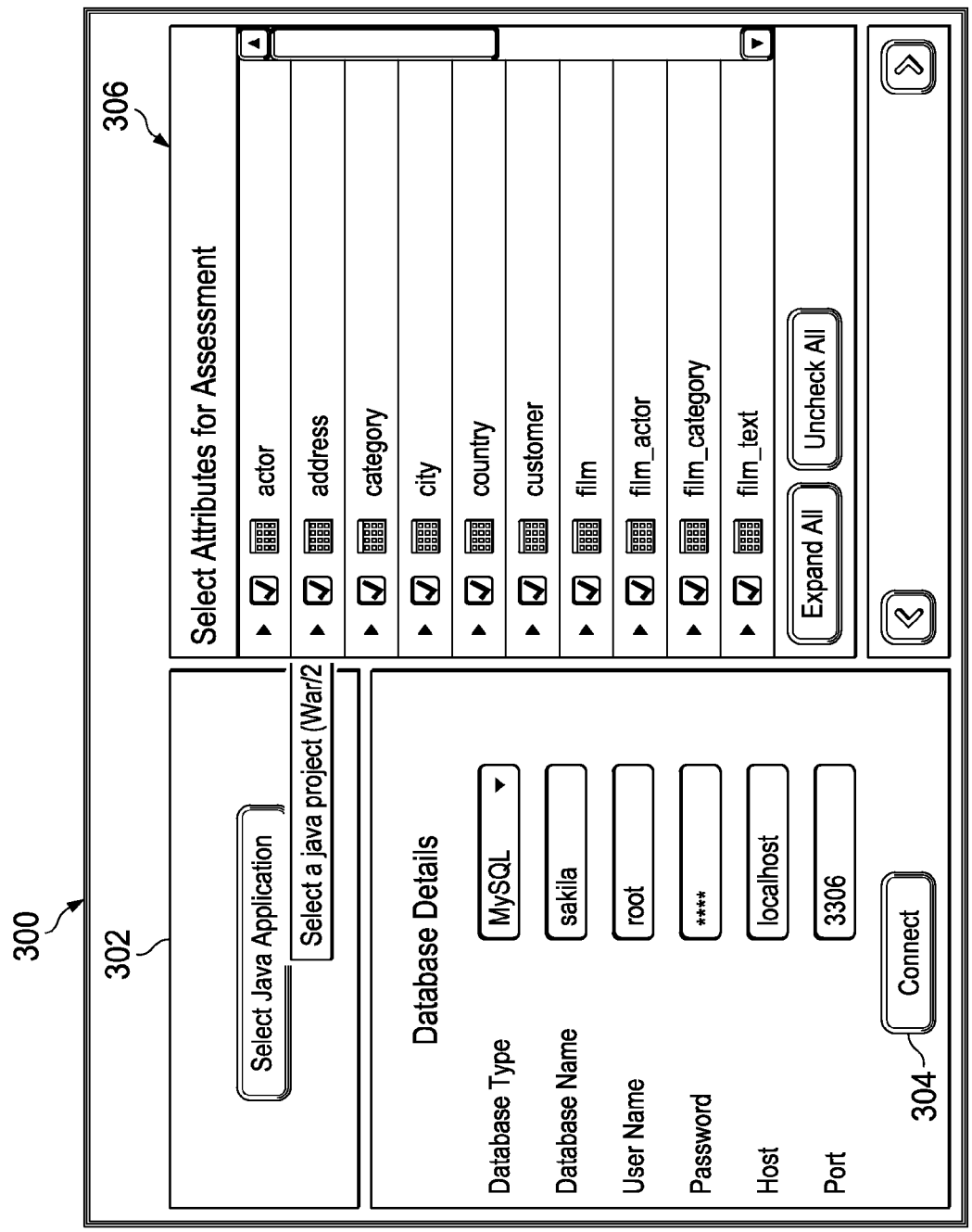

FIG. 3 shows a user interface 300 allowing a user to enter details of the database to be migrated into a database details pane 302. As shown, the database details pane 302 includes user input components to receive indications of the database type, database name, the username and password for logging into the database, an application associated with the database, and a host and port for connecting to the database. The user interface 300 includes the connect button 304 that will initiate connection to the database. Upon connection, the system retrieves a list of attributes from the database, and lists the attributes within the attribute pane 306. The user may select required attributes for a particular database from the attributes pane 306. For example, as shown, the user may select the check boxes next to each of the attributes in the attributes pane 306 to indicate the attribute is a required attribute. A required attribute may be an attribute within the database that will be analyzed while generating migration recommendations for the database. In this way, the user may indicate attributes that may be ignored for migration purposes.

Figure 4:
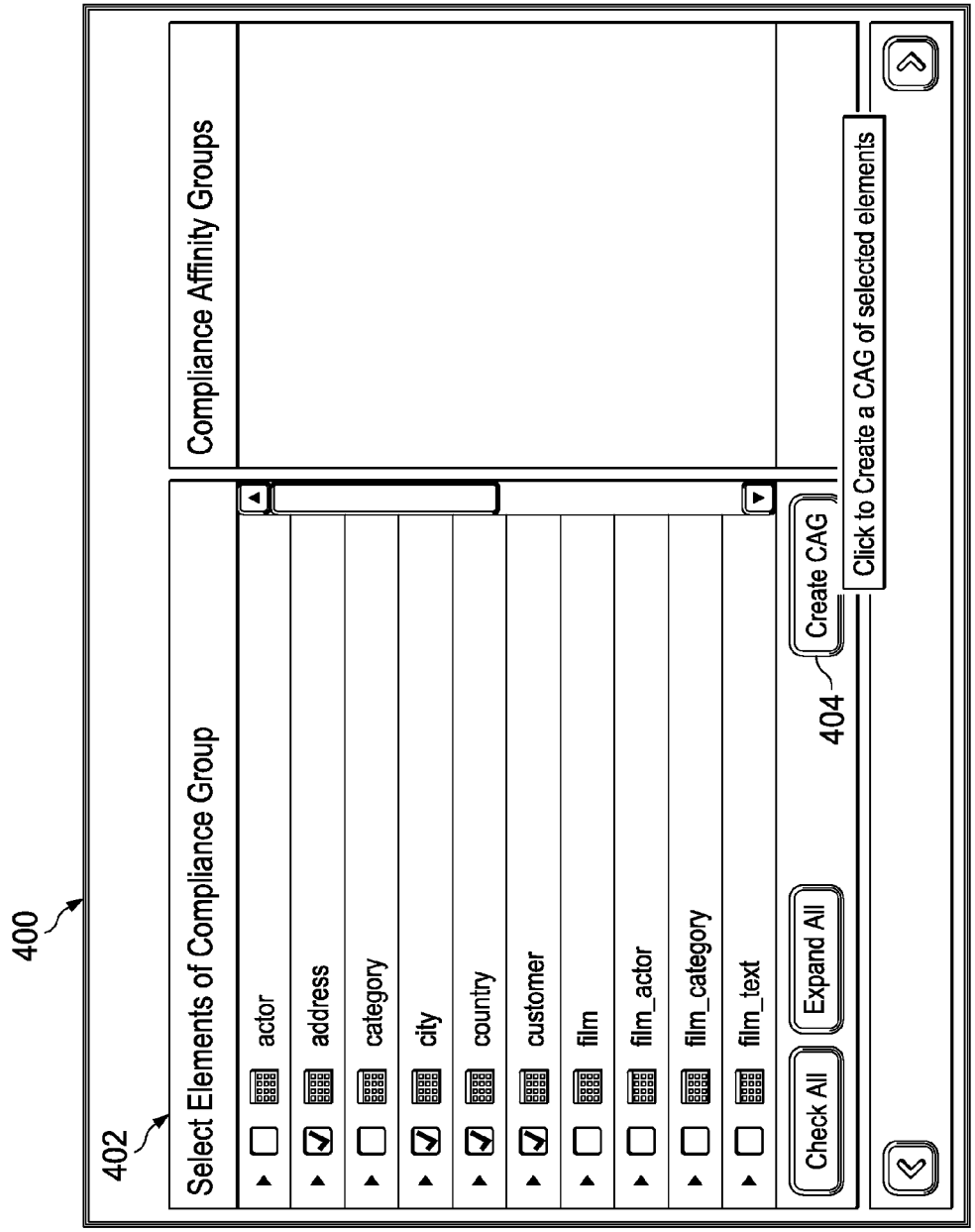
Figure 5:
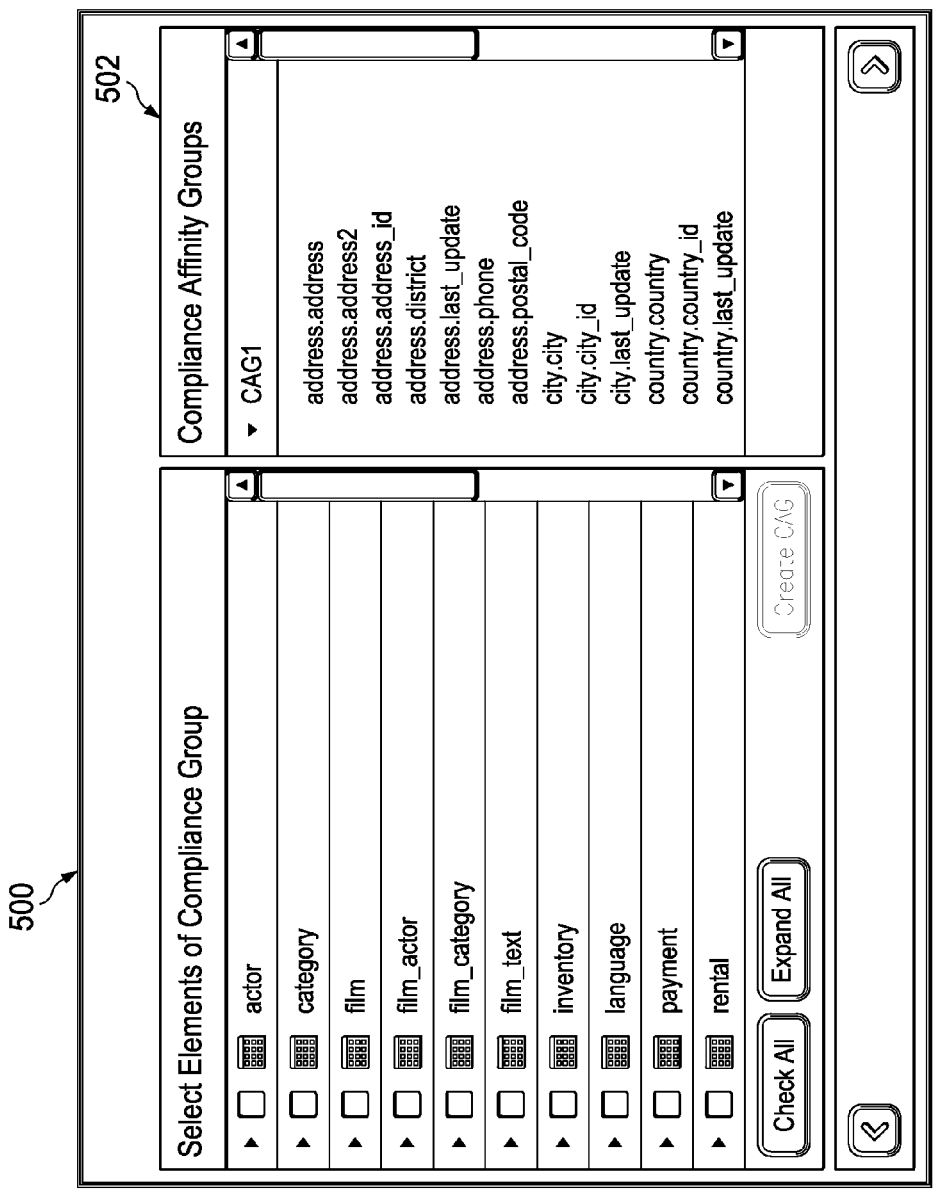

FIG. 4 shows the user interface 400 allowing a user to create compliance affinity groups including sets of attributes. A compliance affinity group may indicate that transactions associated with attributes within the compliance affinity group require consistency, and this should be allocated to the same cloud computing instance or set of instances. The user may select attributes from a selection pane 402, and click a create group button 404 to create a group. FIG. 5 shows a user interface 500 displaying a newly created compliance affinity group 502.

Figure 6:
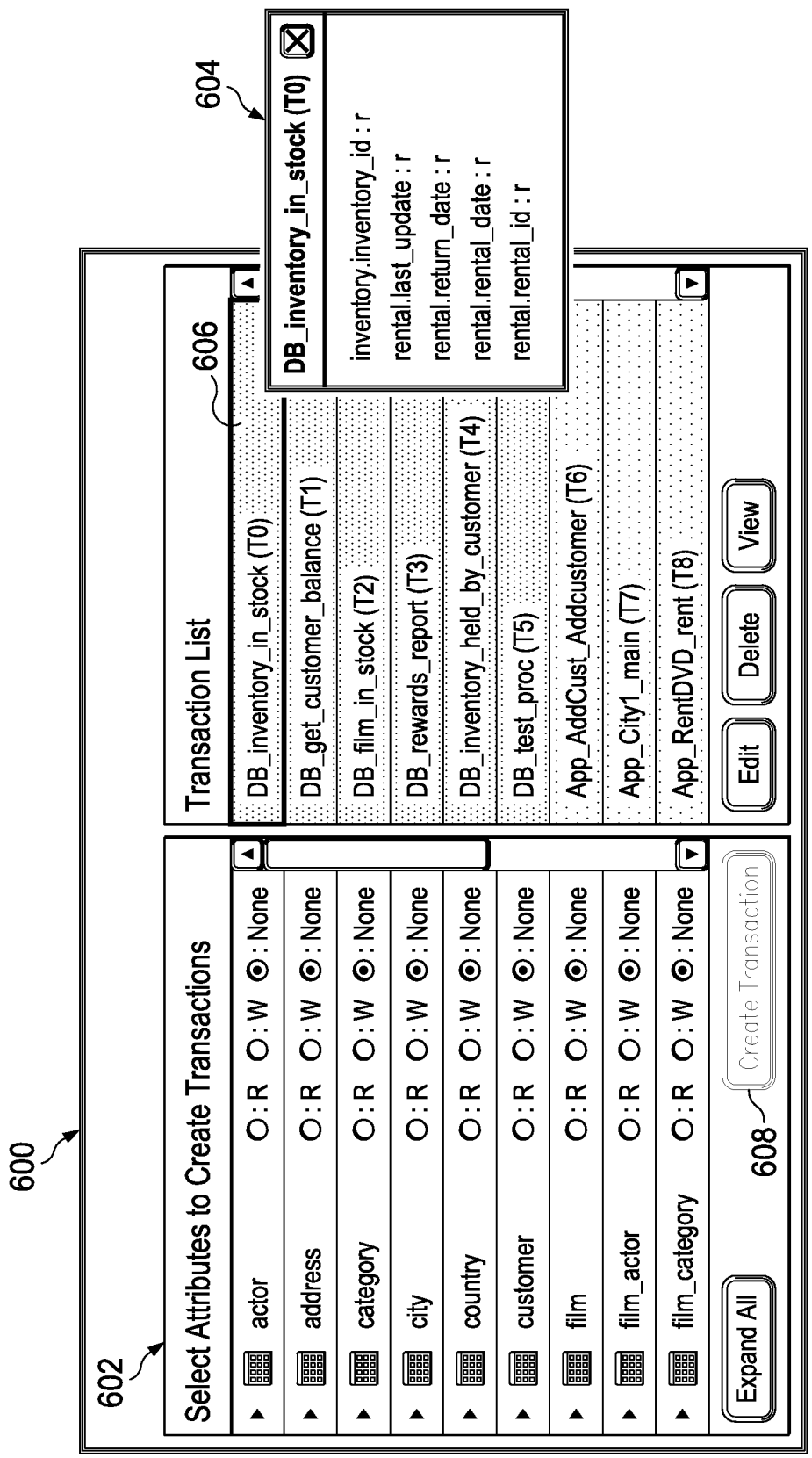

FIG. 6 shows a user interface 600 that allows a user to manage identified transactions. The user may select attributes from an attributes pane 602 and create transactions using a create transactions button 608. A transaction list 606 shows a list of transactions that have been identified, and attributes list 604 shows the list of attributes associated with a selected transaction.

Figure 7:
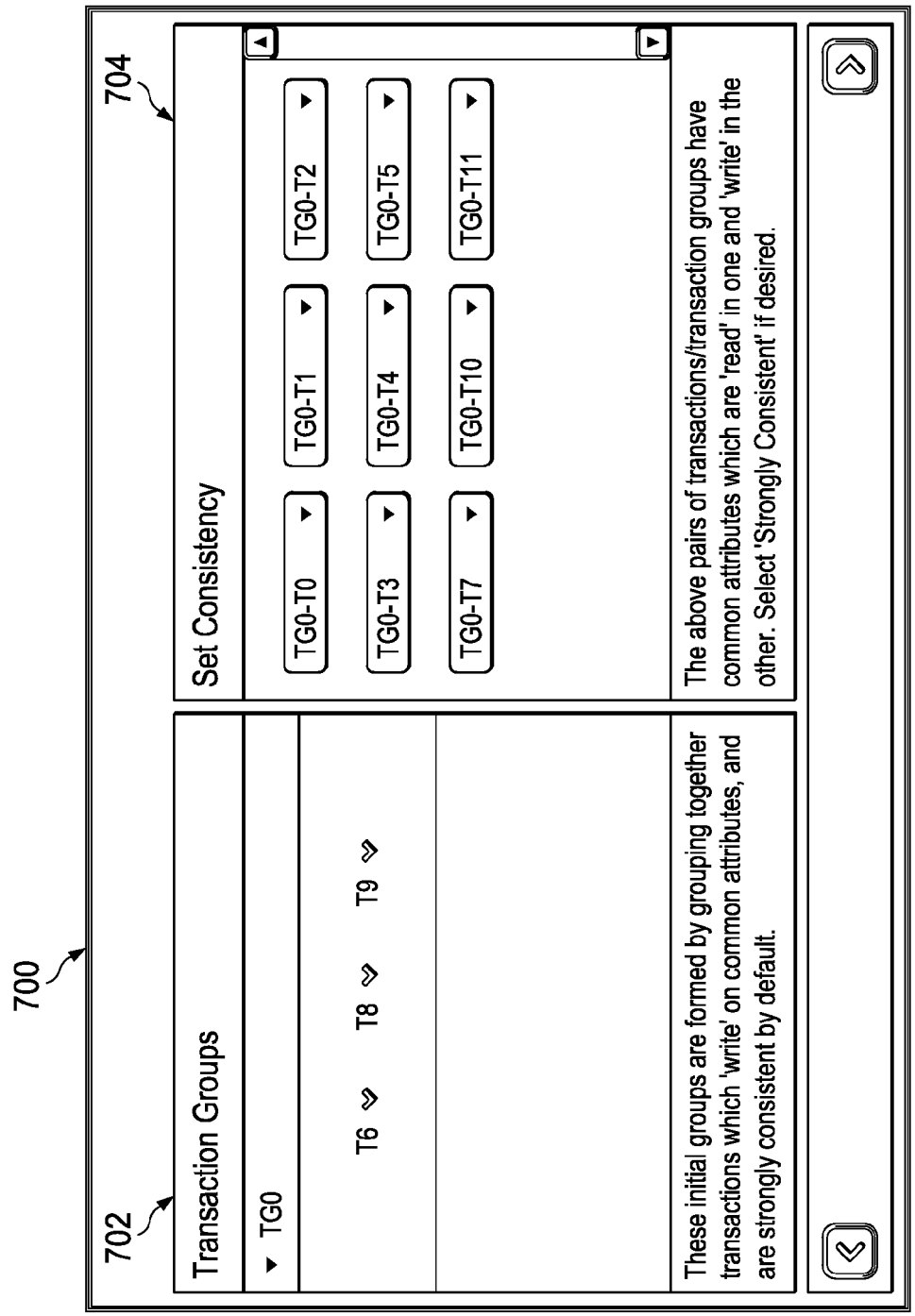
Figure 8:
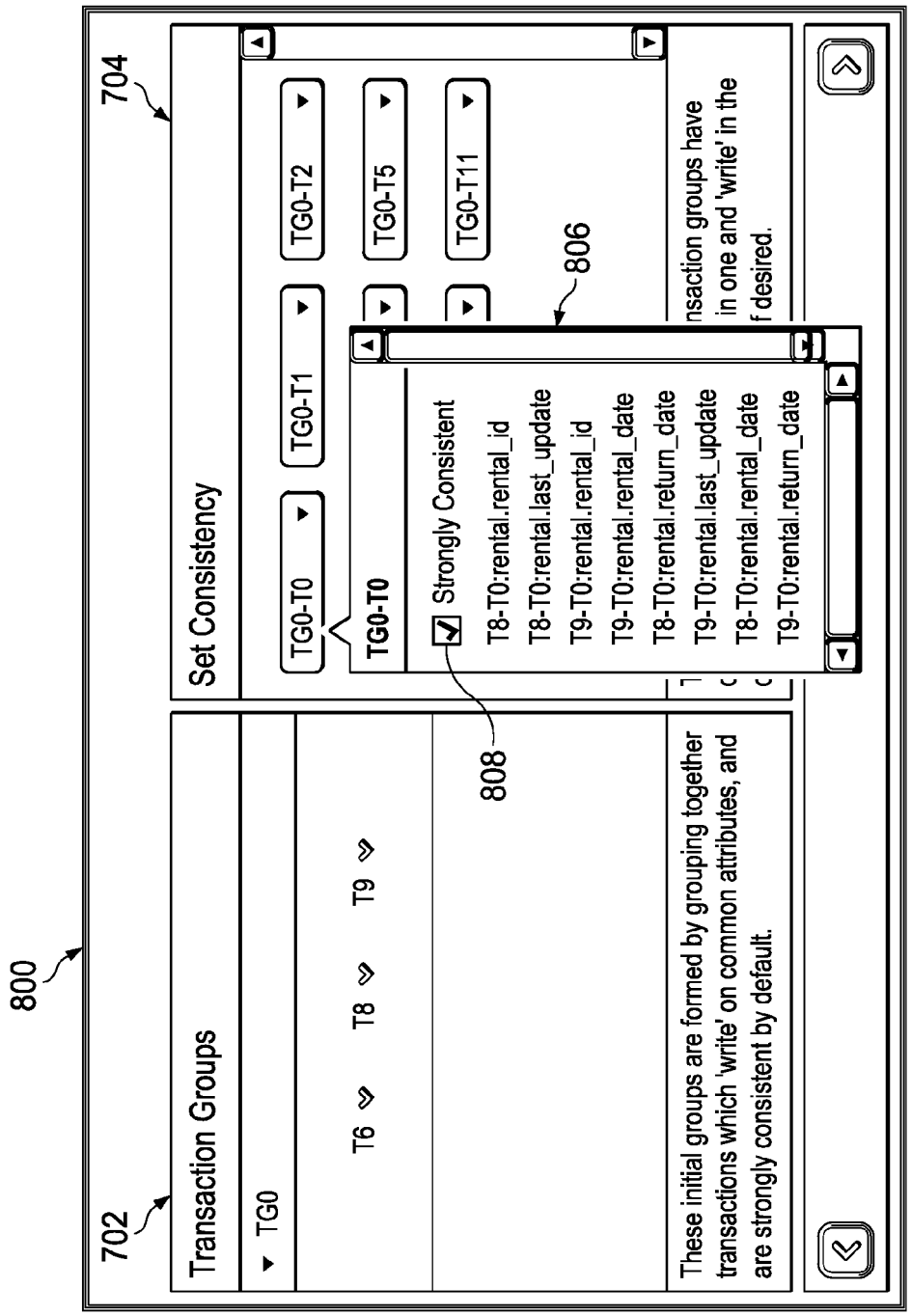

FIG. 7 shows a user interface 700 allows a user to select attributes within a transaction group for which consistency is required. The user may select particular transaction groups from a list 702, and set consistency for the transactions using a pane 704. The pane 704 includes transaction pairs that share common attributes that are read in one transaction and written in another. FIG. 8 shows a user interface 800 in which a user has selected a transaction pair to activate a menu 806 showing the shared attributes between the transaction pair. A checkbox 808 is checked to indicate that strong consistency is required for the shared attributes.

Figure 9:
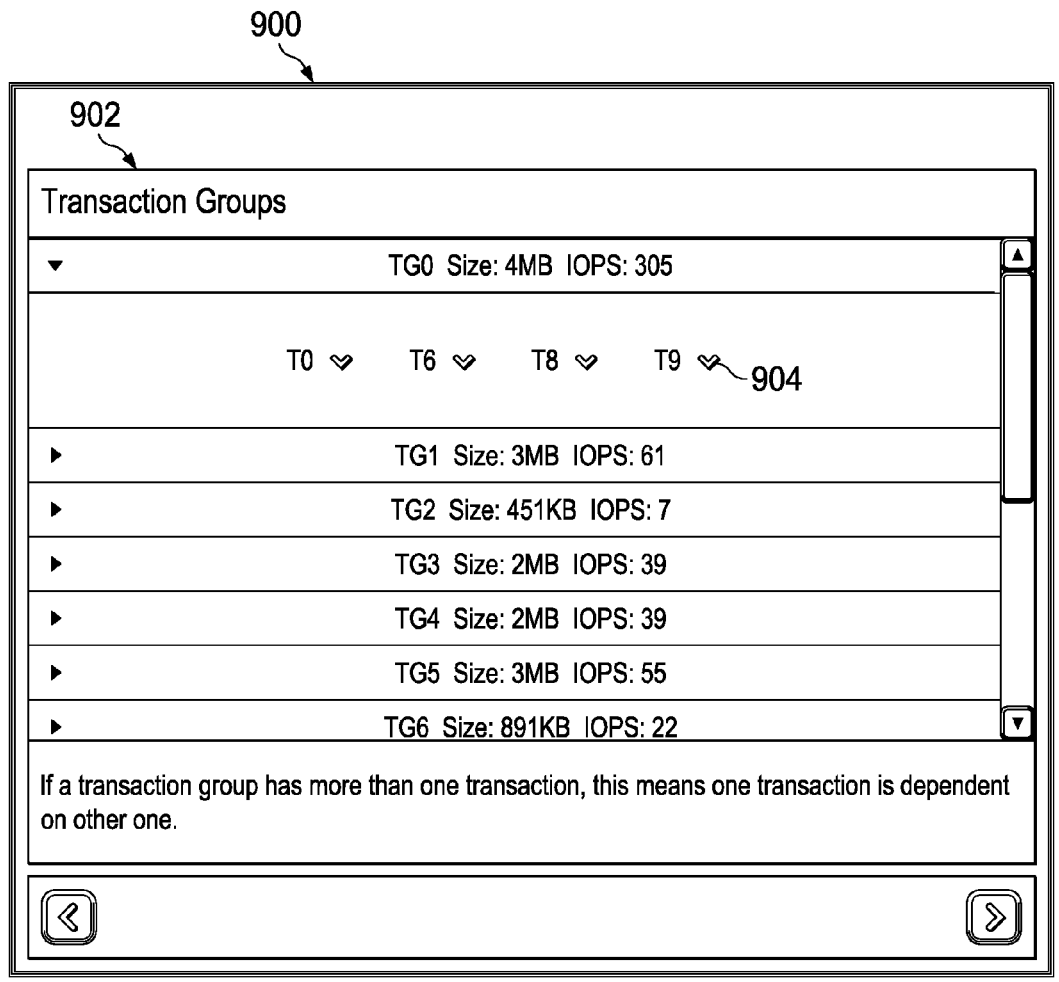

FIG. 9 shows a user interface 900, which allows a user to review the contents of transaction groups and split transactions that do not require strong consistency. A transaction pane 902 shows a list of transaction groups. Individual transactions 904 are shown when the user selects a group. The user may select transactions to split using the interface 900, such as, for example, transactions within a group that do not require strong consistency may be split from the group.

Figure 10:
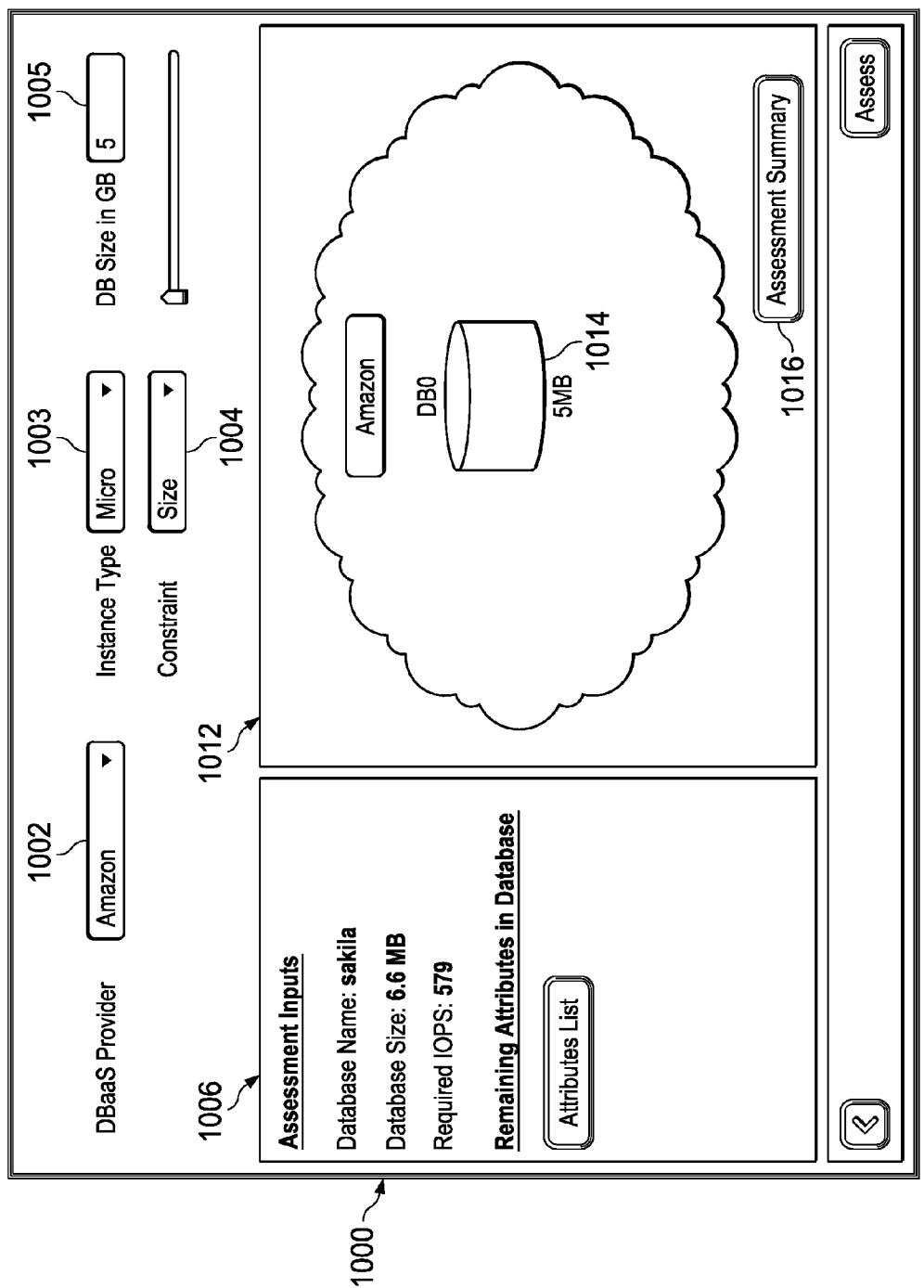

FIG. 10 shows a user interface 1000, which presents migration recommendations to the user. A service provider selection box 1002 allows the user to select between different cloud computing providers, such as, for example, AMAZON, RACKSPACE, MICROSOFT, OPENSTACK, GOOGLE, or other providers. An instance type selection box 1003 is populated with instance types offered by the selected cloud computing provider. Instance types may specify computing parameters associated with each instance of that type, such as, for example, storage, network bandwidth, response time, or other parameters. A constraint box 1004 allows the user to select a constraint or set of constraint used to assess the cloud computing system configuration. For example, in FIG. 10, the size constraint is selected, meaning that the size requirements for the transactions of the database application will be assessed to determine whether the application is suitable for a particular instance type. The user interface 1000 also includes a database size selector 1005 that allows a user to specify the size of the database application.

User interface 1000 includes a set of assessment details 1006 including selected service provider, a selected instance type, and a max size for each instance. Assessment details 1006 may change in response to the user selecting a different service provider from a selection box 1002 or different instance type selection box 1004.

An allocation visualization pane 1012 is a visual representation of how the identified transactions are recommended to be allocated to instances of the selected type. As shown, all identified transactions in the present example are allocated to the instance 1014. The assessment summary button 1016 may initiates the display of the user interface 1150.

Figure 11A:
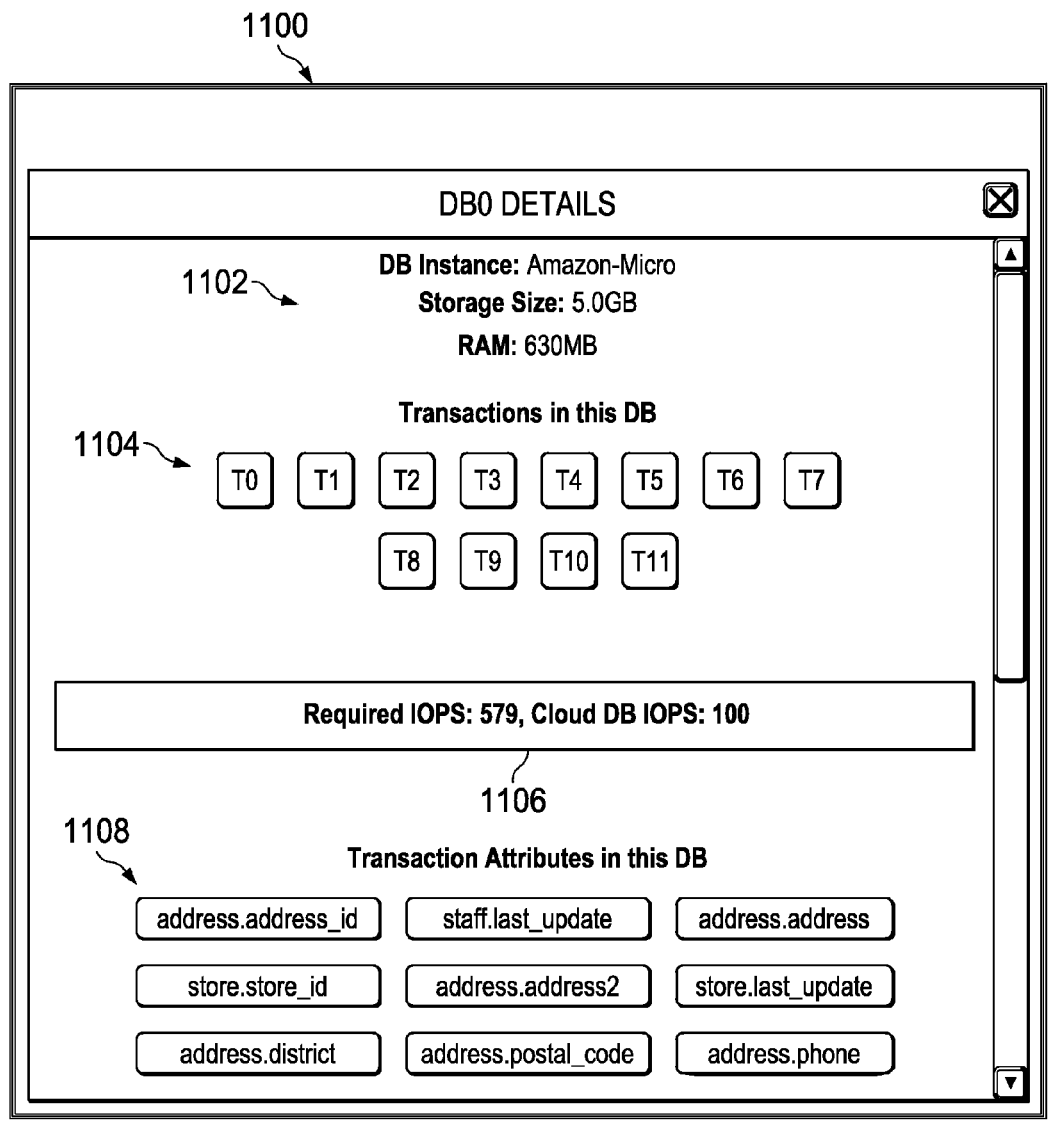

FIG. 11a shows a user interface 1100, which provides a textual representation of the migration recommendations shown in the allocation visualization pane 1012. A set of attributes 1102 associated with the particular instance are shown, along with set of transactions 1104 allocated to a particular instance 1014. A set of performance metrics 1106 is also presented showing the performance of the instance 1014 versus the required performance for the allocated set of transactions. A set of transaction attributes 1108 included in the transactions 1104 is also displayed.

FIG. 11b shows a user interface 1100, which provides a summary of the assessment details. As shown, the user interface 1100 presents a set of inputs 1152 representing the information used in performing the assessment, and a set of outputs 1154 representing the results of the migrations assessment.

Figure 12:
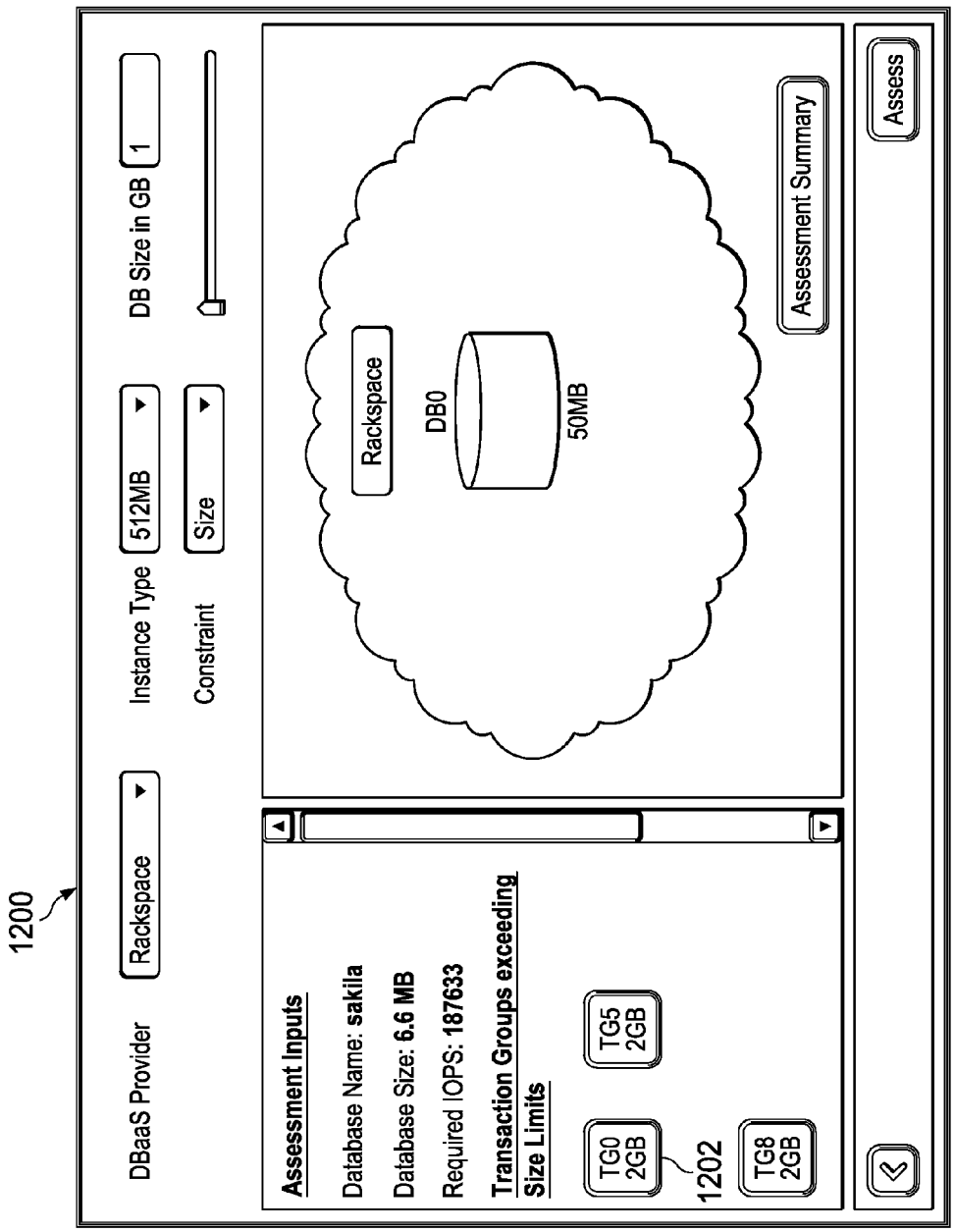

FIG. 12 shows a user interface 1200 presenting a list of infeasible transactions 1202. As shown, all three transactions in the infeasible transactions list include sizes (3 GB) that are greater than the size of the selected instance type (512 MB).

Figure 13:
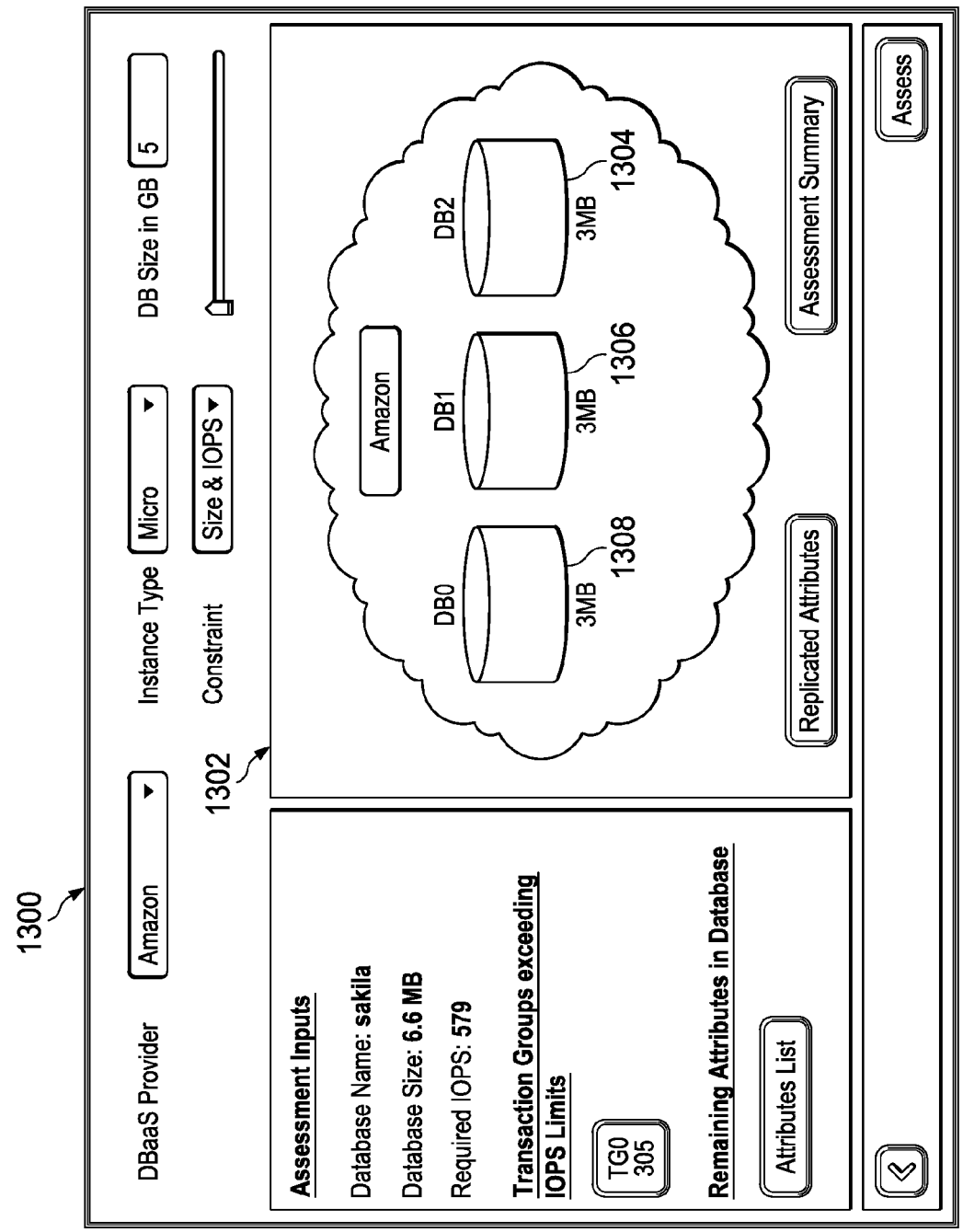

FIG. 13 shows a user interface 1300 in which user has changed the instance type selection from the user interface 1200 to an instance type with a larger max size (3 GB). As shown, the transactions have been removed from the infeasible transactions list, and have been allocated to the three instances 1304, 1306 and 1308 shown in the visualization pane 1302. FIG. 14 shows a user interface 1400 showing an example assessment summary associated with FIG. 13 and similar to that shown in FIG. 11b.

Figure 15:
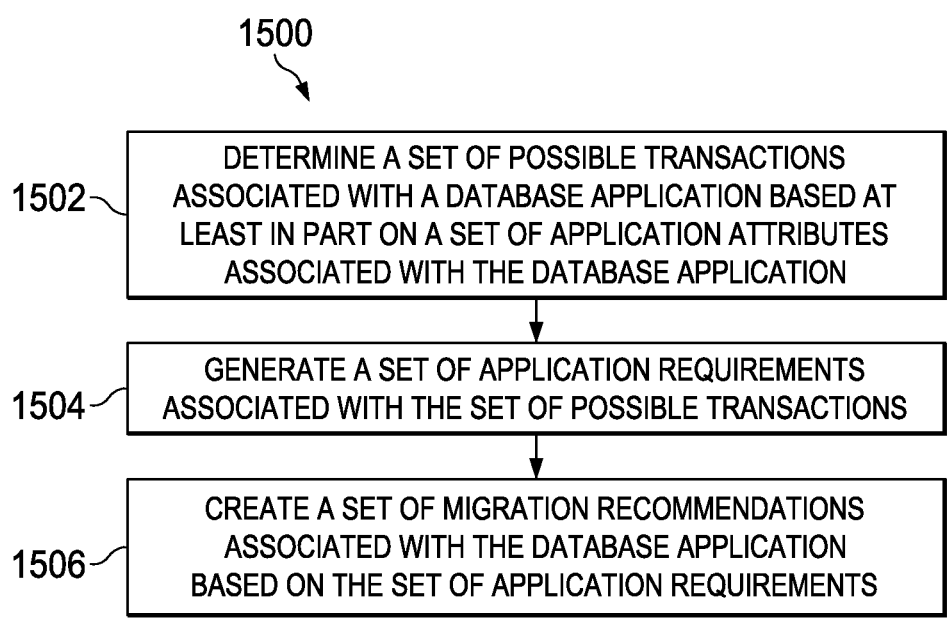
FIG. 15 is a flow chart of an example method for assessing database migrations to cloud computing systems.

FIG. 15 is a flow chart of an example method 1500 for assessing database migrations to cloud computing systems. At 1502, a set of possible transactions associated with the database application is determined based at least in part a set of application attributes associated with the database application. In some cases, the set of application attributes associated with the database application includes a set of application instruction, a database definition, a database usage log, a set of user-provided attributes, or other attributes. The set of application attributes associated with the database application may be determined by parsing definitions associated with the database application. For example, the database application may be associated with an SQL definition file defining the tables, stored procedures, constraints, and other attributes of the database application. A software application may be executed to parse the SQL definition file to determine the set of application attributes. For example, the software application may encounter the following table definition within the SQL definition file:

| CREATE TABLE customer ( | |
|---|---|
| customer_id | INTEGER, |
| name | CHAR(20), |
| address | CHAR(100), |
| zip | CHAR(10), |
| PRIMARY KEY | (customer_id) |
| ); | |

In response, the software application may determine that the database application includes a table named "customer" that includes an integer attribute named "customer_id," a 20-character string attribute named "name," a 100-character string attribute named "address," and a 10-character string attribute named "zip." The software application may also determine that the "customer_id" attribute is the primary key of the "customer" table.

Determining the set of possible transactions associated with the database application may include running a simulation of the database application, such as, for example, based on the database usage log. In some cases, running a simulation of the database application may include executing the database application in a testing environment to determine how the database application may be accessed during live execution. In some implementations, the testing environment may include a server including one or more processors and a memory into which the database application is loaded. The database application may be executed by the one or more processors, along with, in some cases, a database management system for managing the database application. One or more software applications may also be executed by the one or more processors to access the database application in order to determine the set of possible transactions. For example, the database application may be associated with a database usage log including historical access data for the database application during live execution. A software process may be executed to "replay" the database log by performing the accesses described in the log in the order specified by the log. The software process may then identify accesses to the database (transactions) that overlap each other, such as, for example, a write transaction for a certain set of attributes (possibly spanning multiple tables) followed by a read transaction of the same set of attributes. From identifying such overlapping transactions, the software process may determine that the set of attributes require consistency, such that values written to the attributes should be available to read immediately or very soon after they are written. Such a consistency requirement may be used when generating migration recommendations. For example, in order to allow written values to be quickly available for read, the set of attributes should not be widely distributed across different servers within a cloud system, as synchronization between the servers takes time, meaning that values written to the attributes on one server may not be immediately available on another server within the cloud. Such a situation may lead to clients reading stale data (e.g., not reflecting recent writes) in violation of the consistency requirement. Thus, determining the set of possible transactions may comprise accessing a database of the database application according to entries in a database usage log of the database. In particular, each database access provided in the database usage log may be performed in the order specified by the database usage log.

In some cases, performance requirements associated with the database application may be deduced from replaying the database usage log as described above. For example, if the database usage log represents a typical amount and frequency of access for the database application under normal production conditions, the software application may determine, by replaying the database usage log, an average number of accesses per second the database application will experience during normal operation. These performance requirements may be used to determine types and numbers of instances within a cloud computing system to allocate to the database application when determining migration recommendations. Thus, determining the performance requirements may comprise determining an average number of times per second the database application is accessed during normal operation, e.g. by replaying (i.e. analyzing or stepping through) the database usage log as described above.

In some implementations, running the simulation of the database application may include executing a software program associated with the database application, such as a software application designed to utilize the database application (e.g., by reading and writing data to the database application). For example, the software application may be executed in the testing environment and observed to determine how it accesses the database. The software application may be provided with a pre-determined set of input selected to elicit behavior from the software application that approximates how it will access the database application during live execution. In some cases, this pre-determined set of input data may include input data provided by a developer or other stakeholder for the database application or software application, random data generated for the test, historical input data taken from previous production runs of the database application or software application, or other input data. The software application's accesses of the database application during this testing process may be observed to identify overlapping attributes, as described above. Thus, determining the set of possible transactions may include executing a software program associated with the database application and identifying, by observing the software program's behavior, attributes within the database that are accessed in an overlapping manner (as described previously) by the software program.

At 1504, a set of application requirements is generated associated with the set of possible transactions. In some cases, generating the set of application requirements includes a set of transaction requirements, a set of performance requirements, a set of data affinity requirements, a set of storage capacity requirements, or other requirements. In some implementations, generating a set of transaction requirements includes determining a set of transaction groups each including two or more transactions from the set of possible transaction, each transaction group representing transactions that depend on overlapping data attributes, and the set of migration recommendations is configured to place the transactions from each transaction group on a same cloud computing instance. Each transaction group may include at least one write transaction and a corresponding read transaction that reads data written by the at least one write transaction.

In some cases, a particular transaction group may be determined to be unable to execute on the same cloud computing instance based on the set of performance requirements or the set of storage capacity requirements. For example, a particular transaction group may be determined, such as through the simulation described above or through user input, to require 100 IOPS, while the selected instance type may only be able to provide 50 IOPS. In another example, the particular transaction group may require 1 GB of storage (based on the expected size of the accessed tables in the database), and the selected instance type may only be able to provide 500 MB. In response, the particular transaction group may be determined to not require strong consistency, and the set of migration recommendations may be modified to split the particular transaction group across one or more cloud computing instances. The set of migration recommendations may also be modified to retain the particular transaction group on the same cloud computing instance by moving at least one other transaction group to a different cloud computing instance in response to determining that the particular transaction group is unable to execute on the same cloud computing instance and determining that the particular transaction group requires strong consistency.

In some implementations, the set of migration recommendations may be presented on a display to a user, such as in the form of a report or web page. In some cases, the set of migration recommendations may be presented in a graphical user interface by a software application executed by one or more processors. The software application may, in some cases, be operable to receive input from the user specifying changes to the migration recommendations, and to alter the recommendations based on the input and present new recommendations to the user. For example, the user may change parameters associated with a cloud system to which the database application is to be migrated, such as the instance type, instance size, and other parameters. The software application may generate new recommendations based on changes to these parameters, such as, for example, reflecting new allocations of transactions to different instances within the cloud system based on a newly selected instance type or size.

In some cases, the set of consistency requirements includes at least one of atomicity requirements, isolation requirements, durability requirements, or other requirements, the set of storage capacity requirements includes a required amount of data storage capacity, and the set of performance requirements includes a required number of input/output operations per second (IOPS).

At 1506, a set of migration recommendations associated with the database application is created based on the set of application requirements. Creating the set of migration recommendations may include mapping each transaction in the set of possible transactions to a particular type of cloud computing instance included in the cloud computing system. In some cases, a report including the set of migration recommendations is presented.

Figure 16:
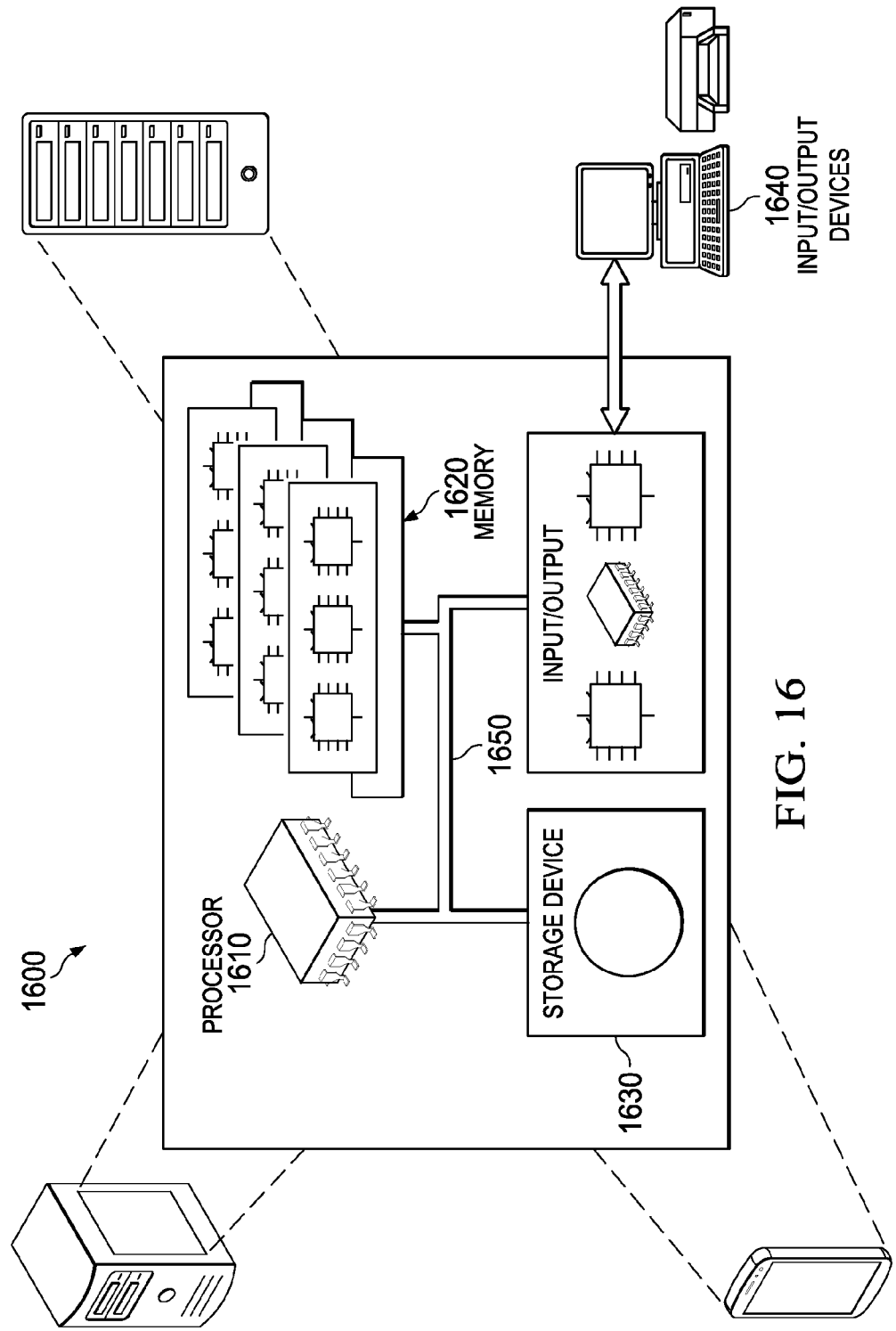
FIG. 16 is a schematic diagram of an example of a generic computer system.

FIG. 16 is a schematic diagram of an example of a generic computer system 1600. The system 1600 can be used for the operations described in association with the method 1500, and used to present and perform the operations of the user interfaces 300-1400, according to some implementations. The system 1600 may be included in the systems 100 and 200.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit. The processor 1610 and the memory 1620 may perform data manipulation and validation, including execution of data quality jobs.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device. The storage device 1630 may store monitoring data collected and data quality rule representations.

The input/output device 1640 provides input/output operations for the system 1600. In one implementation, the input/output device 1640 includes a keyboard and/or pointing device. In another implementation, the input/output device 1640 includes a display unit for displaying graphical user interfaces. The input/output device 1640 may be used to perform data exchange with source and target data quality management and/or processing systems.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:
1. A computer-implemented method comprising:
  determining, by a migration server including one or more hardware processors, a set of possible transactions associated with a database application based at least in part on a set of application attributes associated with the database application;
  generating, by the migration server, a set of transaction requirements associated with the set of possible transactions, wherein generating the set of transaction requirements includes determining a set of transaction groups, wherein each transaction group includes two or more transactions from the set of possible transactions, each transaction group representing transactions that depend on overlapping data attributes, and wherein each transaction group includes at least one write transaction and a corresponding read transaction that reads data written by the at least one write transaction;

creating, by the migration server, a set of migration recommendations associated with the database application based on the set of transaction requirements, the set of migration recommendations configured to allow the database application to be migrated to a cloud computing system and to allow the database application to comply with the set of transaction requirements when executed in the cloud computing system, and the set of migration recommendations configured to place the transactions from each transaction group on a same cloud computing instance within the cloud computing system;

determining, by a transaction analysis engine, that a particular transaction group is unable to execute on the same cloud computing instance based on the set of performance requirements or the set of storage capacity requirements;

determining, by the transaction analysis engine, whether the particular transaction group requires strong consistency; and modifying the set of migration recommendations to split the particular transaction group across one or more cloud computing instances in response to determining that the particular transaction group is unable to execute on the same cloud computing instance and determining that the particular transaction group does not require strong consistency; and modifying the set of migration recommendations to retain the particular transaction group on the same cloud computing instance by moving at least one other transaction group to a different cloud computing instance in response to determining that the particular transaction group is unable to execute on the same cloud computing instance and determining that the particular transaction group requires strong consistency.

2. The method of claim 1, further comprising presenting a report including the set of migration recommendations.

3. The method of claim 1, wherein creating the set of migration recommendations includes mapping each transaction in the set of possible transactions to a particular type of cloud computing instance included in the cloud computing system.

4. The method of claim 1, wherein generating the set of transaction requirements further includes generating at least one of: a set of performance requirements, a set of data affinity requirements, or a set of storage capacity requirements.

5. The method of claim 4, wherein the set of performance requirements includes a required number of input/output operations per second (IOPS).

6. The method of claim 4, wherein the set of storage capacity requirements includes a required amount of data storage capacity.

7. The method of claim 1, wherein the set of transaction requirements includes at least one of atomicity requirements, isolation requirements, or durability requirements.

8. The method of claim 1, wherein the set of application attributes associated with the database application includes at least one of: a set of application instruction, a database definition, a database usage log, or a set of user-provided attributes.

9. The method of claim 1, wherein determining the set of possible transactions associated with the database application includes running a simulation of the database application.

10. The method of claim 1, wherein determining the set of possible transactions includes accessing the database application according to entries in a database usage log associated with the database application, wherein each database access provided in the database usage log is performed in an order specified by the database usage log.

11. The method of claim 1, wherein generating the set of transaction requirements includes generating a set of performance requirements including an average number of times per second the database application is accessed during normal operation, wherein the average number is determined by accessing the database application according to entries in a database usage log associated with the database application.

12. A non-transitory, computer-readable medium storing instructions operable when executed to cause at least one processor to perform operations comprising:

determining a set of possible transactions associated with a database application based at least in part on a set of application attributes associated with the database application;

generating a set of transaction requirements associated with the set of possible transactions, wherein generating the set of transaction requirements includes determining a set of transaction groups, wherein each transaction group includes two or more transactions from the set of possible transactions, each transaction group representing transactions that depend on overlapping data attributes, and wherein each transaction group includes at least one write transaction and a corresponding read transaction that reads data written by the at least one write transaction;

creating a set of migration recommendations associated with the database application based on the set of transaction requirements, the set of migration recommendations configured to allow the database application to be migrated to a cloud computing system and to allow the database application to comply with the set of transaction requirements when executed in the cloud computing system, and the set of migration recommendations configured to place the transactions from each transaction group on a same cloud computing instance within the cloud computing system;

determining, by a transaction analysis engine, that a particular transaction group is unable to execute on the same cloud computing instance based on the set of performance requirements or the set of storage capacity requirements;

determining, by the transaction analysis engine, whether the particular transaction group requires strong consistency; and modifying the set of migration recommendations to split the particular transaction group across one or more cloud computing instances in response to determining that the particular transaction group is unable to execute on the same cloud computing instance and determining that the particular transaction group does not require strong consistency; and modifying the set of migration recommendations to retain the particular transaction group on the same cloud computing instance by moving at least one other transaction group to a different cloud computing instance in response to determining that the particular transaction group is unable to execute on the same cloud computing instance and determining that the particular transaction group requires strong consistency.

13. The computer-readable medium of claim 12, the operations further comprising presenting a report including the set of migration recommendations.

14. The computer-readable medium of claim 12, wherein creating the set of migration recommendations includes mapping each transaction in the set of possible transactions to a particular type of cloud computing instance included in the cloud computing system.

15. The computer-readable medium of claim 12, wherein generating the set of transaction requirements further includes generating at least one of: a set of performance requirements, a set of data affinity requirements, or a set of storage capacity requirements.

16. A system comprising:
   a database migration server including one or more processors and operable to interact with a database server hosting a database application to determine a set of possible transactions associated with the database application based at least in part on a set of application attributes associated with the database application;
   a migration recommendation server including one or more processors and operable to:
      receive the set of attributes from the database migration server;
      generate a set of transaction requirements associated with the set of possible transactions, wherein the set of transaction requirements includes a set of transaction groups, wherein each transaction group includes two or more transactions from the set of possible transactions, each transaction group representing transactions that depend on overlapping data attributes, and wherein each transaction group includes at least one write transaction and a corresponding read transaction that reads data written by the at least one write transaction; and
      create a set of migration recommendations associated with the database application based on the set of transaction requirements, the set of migration recommendations including instructions for migrating the database application to a cloud computing system while ensuring that the migrated database application will comply with the set of transaction requirements when executed in the cloud computing system, and the set of migration recommendations including instructions for placing the transactions from each transaction group on a same cloud computing instance within the cloud computing system.

\* \* \* \* \*

UNITED STATES PATENT AND TRADEMARK OFFICE
CERTIFICATE OF CORRECTION

| | | |
|---|---|---|
| PATENT NO. | : 9,703,811 B2 | Page 1 of 1 |
| APPLICATION NO. | : 14/542030 | |
| DATED | : July 11, 2017 | |
| INVENTOR(S) | : Shubhashis Sengupta et al. | |

It is certified that error appears in the above-identified patent and that said Letters Patent is hereby corrected as shown below:

On the Title Page

Column 1, item (72) Inventors:, Line 1, delete "Karntaka (IN);" and insert -- Karnataka (IN); --, therefor.

In the Claims

In Claim 16, Column 20, Line 1, after "set of" insert -- application --.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*